(12) United States Patent
Allen et al.

(10) Patent No.: US 9,564,936 B2
(45) Date of Patent: Feb. 7, 2017

(54) RADIO FREQUENCY FEEDTHROUGH TO PORTABLE DEVICE

(71) Applicant: Appareo Systems, LLC, Fargo, ND (US)

(72) Inventors: Robert M. Allen, Reiles Acres, ND (US); Bradley R. Thurow, Fargo, ND (US); Jeffrey L. Johnson, West Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 0 days.

(21) Appl. No.: 14/710,518

(22) Filed: May 12, 2015

(65) Prior Publication Data

US 2016/0336980 A1    Nov. 17, 2016

(51) Int. Cl.
*H04B 1/38* (2015.01)
*H04B 1/08* (2006.01)
*H01Q 1/28* (2006.01)
*H04B 1/707* (2011.01)
*H04B 1/3822* (2015.01)

(52) U.S. Cl.
CPC ............... *H04B 1/082* (2013.01); *H01Q 1/28* (2013.01); *H04B 1/3822* (2013.01); *H04B 1/707* (2013.01)

(58) Field of Classification Search
CPC .... G01S 13/9303; G01S 13/781; G01S 13/91; G01S 13/74; G01S 13/765; G01S 13/825; G01S 13/867; G01S 13/878; G01S 13/92; G01S 13/93; G01S 2013/916; G01S 2205/005; G01S 3/023; G01S 7/003; G01S 7/021; G01S 13/94; H04B 1/18
USPC ........................................................ 455/90.1
See application file for complete search history.

(56) References Cited

U.S. PATENT DOCUMENTS

| | | | | |
|---|---|---|---|---|
| 5,689,266 A | * | 11/1997 | Stelling | G01S 7/4004 342/165 |
| 8,155,612 B1 | * | 4/2012 | Husted | H04B 1/406 455/132 |
| 2012/0038501 A1 | * | 2/2012 | Schulte | G01S 13/782 342/30 |
| 2015/0341796 A1 | * | 11/2015 | Williams | H04H 20/06 725/31 |

* cited by examiner

*Primary Examiner* — Ajibola Akinyemi
(74) *Attorney, Agent, or Firm* — Law Office of Mark Brown, LLC; Mark E. Brown

(57) ABSTRACT

An aviation transponder system comprising a permanently-mounted antenna, a permanently-mounted receiver module comprising a receiver, a signal splitter, and an external connector, and a portable receiver module, wherein a signal received on the permanently-mounted antenna is passed to the signal splitter of the permanently-mounted receiver module, wherein the signal splitter splits the signal such that the signal is sent to both the receiver and to the external connector, and wherein the portable receiver module is connected to the external connector, whereby the permanently-mounted antenna is used by the receiver of the permanently-mounted receiver module and fed through the permanently-mounted receiver module and made available to the portable receiver module through the external connector.

8 Claims, 3 Drawing Sheets

RADIO FREQUENCY FEEDTHROUGH TO PORTABLE DEVICE

BACKGROUND OF THE INVENTION

1. Field of the Invention

This invention relates generally to the field of aviation, and specifically to the use of a permanently mounted antenna with a portable device.

2. Description of the Related Art

The use of both permanently-mounted avionics (avionics modules integral to an aircraft, installed "permanently" in the aircraft by a qualified installation technician) and portable electronics (hand-held devices that can be carried in and out of an aircraft as needed) is common to the aviation industry. Both types of equipment have their advantages.

For example, permanently-mounted avionics modules, and in particular avionics modules which are radio frequency (RF) receivers, are installed with rugged mounts using certified processes and installation procedures. They are connected to permanently-mounted antenna when needed, and the antenna are mounted on the exterior of the aircraft, allowing the antenna to have the best possible view of the systems with which they are to communicate. These systems perform well, are reliable, and provide confidence to the operators (pilots) of the aircraft.

Permanently-mounted RF avionics, however, are not as flexible as portable RF electronics, and they are typically many times more expensive than portable RF electronics. Portable RF electronics devices are typically within the price range of general aviation pilots and can be moved easily from one aircraft to the next. Portable RF electronics devices often offer the same types of information as the more expensive permanently-mounted systems, at a fraction of the cost. But portable RF electronics do have their own weakness in that they do not tie into the permanently-mounted, certified antenna systems on the exterior of the aircraft, and thus their reception may suffer as a result.

What is needed in the industry is a system and method for providing the flexibility and low cost of a portable electronic device, specifically an RF receiver, while allowing that device to be tied into a permanently-installed antenna system for best performance.

SUMMARY OF THE INVENTION

According to one aspect of the invention, an aviation transponder system is described, comprising a permanently-mounted antenna, a permanently-mounted receiver module comprising a receiver, a signal splitter, and an external connector, and a portable receiver module, wherein a signal received on the permanently-mounted antenna is passed to the signal splitter of the permanently-mounted receiver module, wherein the signal splitter splits the signal such that the signal is sent to both the receiver and to the external connector, and wherein the portable receiver module is connected to the external connector, whereby the permanently-mounted antenna is used by the receiver of the permanently-mounted receiver module and fed through the permanently-mounted receiver module and made available to the portable receiver module through the external connector.

According to another aspect of the invention, an aviation antenna system is described, comprising a permanently-mounted antenna, a permanently-mounted antenna access module comprising a signal splitter, and at least one external connector, and a portable receiver module, wherein a signal received on the permanently-mounted antenna is passed to the signal splitter of the permanently-mounted antenna access module, wherein the signal splitter directs the signal such that the signal is sent to the at least one external connector, and wherein the portable receiver module is connected to the external connector, whereby the permanently-mounted antenna is fed through the permanently-mounted antenna access module and made available to the at least one external connector.

These aspects, as well as the features, functions, and advantages described herein, can be achieved independently in various embodiments of the present invention or may be combined in yet other embodiments in which further details can be seen with reference to the following description and drawings.

BRIEF DESCRIPTION OF DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DETAILED DESCRIPTION OF THE INVENTION

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate.

II. Preferred Embodiment RF Feedthrough to Portable Device

Figure 1:
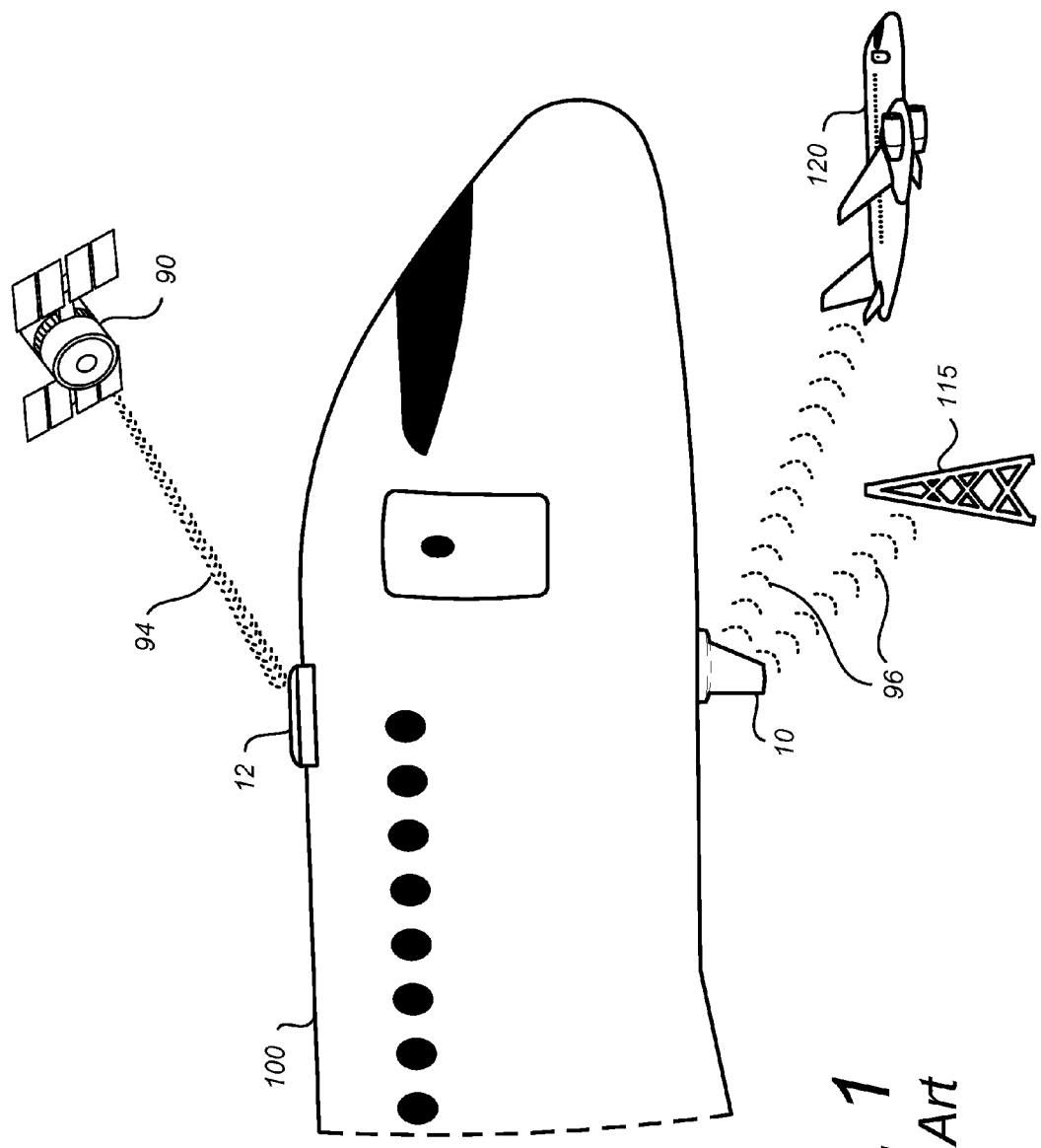
FIG. 1 is an illustration showing how an antenna in the prior art may be mounted on to the exterior of an aircraft.
Figure 2:
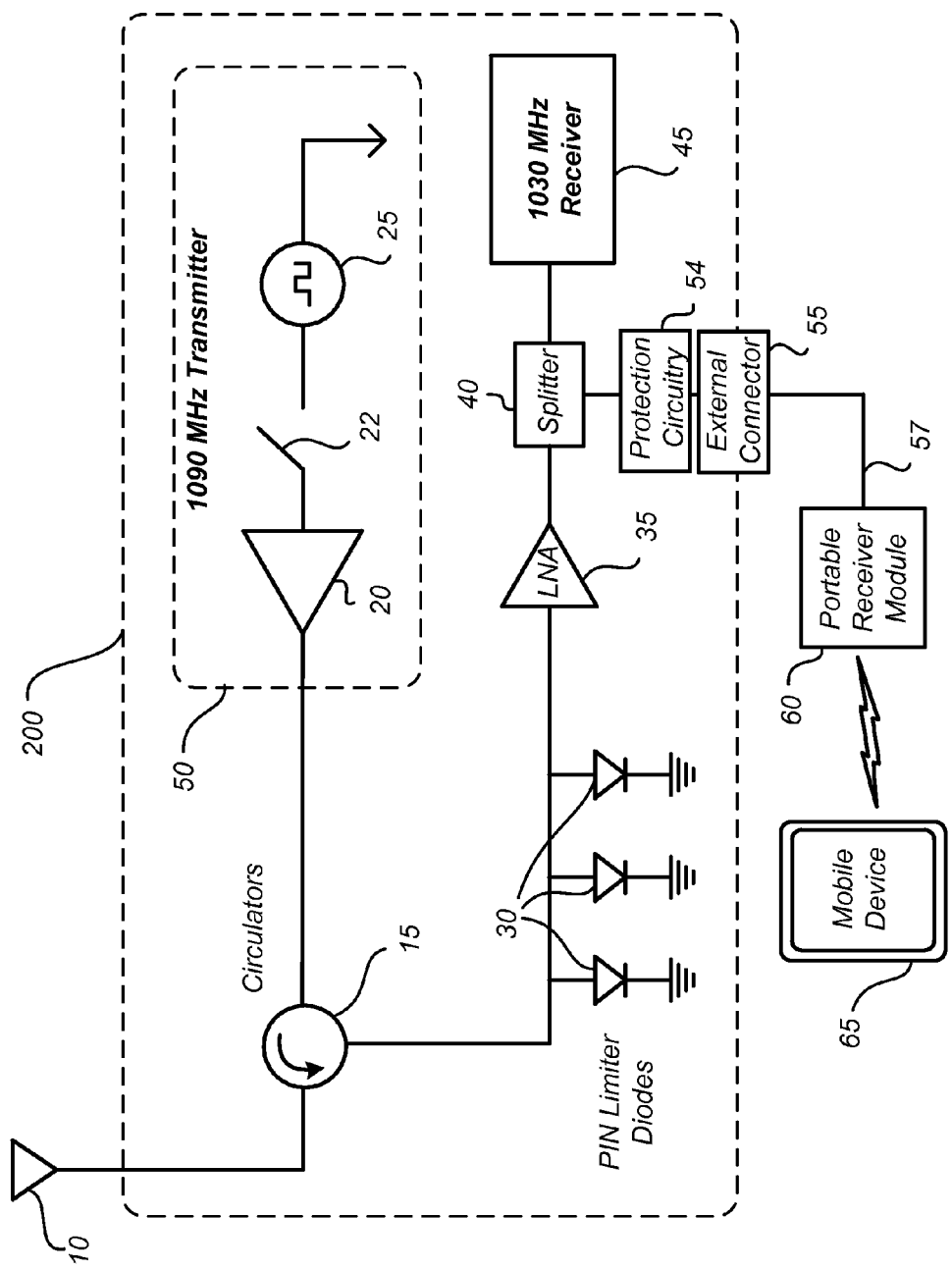
FIG. 2 is a block diagram of the transponder of the present invention, enabling the sharing of an external, permanently-mounted antenna between an installed transponder and a portable device.

With reference now to the drawings, and in particular to FIGS. 1 and 2 thereof, a new transponder device will be described.

FIG. 1 is an image from the prior art, showing the fuselage of an aircraft 100, a typical transponder antenna 10, and a typical global navigation satellite system (GNSS) antenna 12. It is very common for various kinds of transponder antennas 10 and GNSS antennas 12 to be mounted to the exterior surface or fuselage of an aircraft 100, as shown here. Mounting of these antennas 10 and 12 must be performed by a qualified technician and the antennas must be certified for use on the aircraft to ensure safe mounting.

A typical transponder antenna 10 is mounted on the underside of the aircraft fuselage 100 so that transmissions 96 can best be sent to ground-based stations 115 and/or other aircraft 120. The transponder antenna 10 can also receive transmissions from these same ground-base stations 115 and/or other aircraft 96. A typical GNSS antenna 12 is mounted on the top side of the aircraft fuselage 100 to best allow for the reception of signals 94 from GNSS satellites 90 in orbit around the Earth.

The use of an approved, certified antenna mounted by a qualified installation technician ensures the best possible signal reception for all types of antennas. However, portable devices (that is, devices which are not permanently mounted in an aircraft but which may be carried on or off the aircraft by a pilot or other personnel) do not have the benefit of permanently-installed antennas and thus often suffer in their ability to receive transmissions from satellite or on-ground systems, or signals sent from other aircraft.

For the purposes of this discussion, the specification shall refer to antennas and modules that have been mounted directly to an aircraft by a qualified installation technician as "permanently-mounted" or "permanently-installed." These terms shall be used to refer only to antennas or devices which are mounted such that they are considered an integral part of the aircraft, and such that they cannot be picked up and moved without uninstalling them. The terms "portable" or "mobile" will be used to refer to antennas or devices which are not mounted to the aircraft in other than a temporary fashion (such as Velcro, a suction cup, a removable clamp, etc.), and which can be taken out of the aircraft without the use of special equipment or training It should also be noted that transponder antenna 10 and GNSS antenna 12 may already exist on the aircraft 100. That is, antennas 10 and/or 12 may exist on an aircraft and be in use by other existing systems not related to this invention, and therefore the present invention may make used of these existing antennas and not require a new installation at all.

The present invention, detailed in FIG. 2, solves these problems by allowing the permanently mounted antenna or antennas from an on-board system to be "fed through" to and shared with a portable device.

Turning now to FIG. 2, we see a block diagram of a transponder 200, such as an ADS-B transponder, or any other appropriate type of transponder module. The transponder 200 is connected to a transponder antenna 10 which, as has been previously described in FIG. 1, is mounted on the exterior of the aircraft fuselage 100, typically on the underside of said fuselage 100.

The transponder antenna 10 is typically used for both transmitting signals from the transponder 200 and for receiving signals from other systems. The intent of this invention is to provide a way for the transponder antenna 10 (or any other type of permanently-mounted antenna, such as a GNSS antenna 12, as shown in FIG. 1) to be fed through and shared with a portable or mobile receiver module 60. It should be noted that the embodiment shown in FIG. 2 shows the invention as it works with a transponder antenna 10, but the same concepts illustrated here would work for the feed-through of a GNSS antenna 12, or any appropriate type of permanently-mounted, external antenna.

FIG. 2 shows one embodiment of a transponder for use in the present invention, but it is important to note that it is possible to vary the components shown in FIG. 2 and still meet the intent of the present invention. The antenna 10 is connected to the transponder 200. The transponder 200 is shown here as a dashed line, where the dashed line is intended to represent the boundary of the transponder 200, and any components shown inside the dashed box are intended to be components internal to the transponder 200. However, the transponder 200 may be any appropriate number of separate physical modules, from one to multiple. For the purposes of illustration herein, the specification will describe the transponder 200 as if it is a single physical module.

The transponder 200 in this embodiment consists of two primary functions/components, a transmitter 50 and a receiver 45. In the embodiment shown, transmitter 50 is a 1090 MHz transmitter, and receiver 45 is a 1030 MHz receiver. It should be noted that alternate frequencies that may be received by receiver 45 include, but are not limited to, 978 MHz and 1090 MHz. The example shown is not intended to be limiting in any way.

Aircraft transponders typically transmit at a frequency of 1090 MHz and receive requests or "interrogations" at a frequency of 1030 MHz, which allows the transponders 200 to communicate with other aviation systems, such as ground radar stations, which transmit at 1030 MHz and receive at 1090 MHz (the opposite of a typical transponder). Although the frequencies shown in this example are typical of an aircraft transponder, other frequencies can be used without deviating from the inventive concept described herein.

The transmitter 50 comprises a signal generator 25, a transmit switch 22, and an amplifier 20 for boosting the signal to a usable level. The signal to be transmitted leaves the amplifier 20 and passes through one or more circulators 15. The circulators 15 take in signals on one of several ports and direct the signal to different specific port on the circulator 15. For example, the circulator 15 shown in FIG. 2 will take signals sent from the transmitter 50 and direct them to the external transponder antenna 10, but the same circulator 15 will take signals received on the external antenna 10 and route them down to the receiver 45 instead of back toward the transmitter 50. A circulator 15 is common to a transponder and well known to one skilled in the art, and need not be further explained here. Thus, signals generated by the transmitter 50 are sent through the circulator 15 to the external antenna 10 for broadcast.

It should be noted that a circulator 15 is a common design choice in an RF circuit of this type, but it is not the only type of RF structure or RF component that could be used to do the same job. The embodiments shown herein are meant to be exemplary and not limiting in any way. The types of components that could be used to accomplish the same function are well known to one skilled in the art and therefore are not explained in detail herein.

The same external antenna 10 may be used for the receipt of transmissions intended for the receiver 45. The incoming signal from external antenna 10 will arrive at the circulator 15 and be routed down toward the receiver 45 portion of the transponder 200 instead of to the transmitter 50. The incoming signal is directed through one or more PIN limiter diodes 30. The purpose of a PIN limiter diode 30 in this type of application is to provide protection to sensitive circuitry by limiting the amount of current that can pass through them. If the current from a signal passing through the PIN limiter diodes 30 is relatively small, the PIN limiter diodes 30 have very little effect on the current passing through them. If, however, the current from the signal passing through the PIN limiter diodes 30 is large, the PIN limiter diodes 30 begin to conduct current and shunt much of the excess current to ground, thus protecting the circuit on the other side of the PIN limiter diodes 30. The use of PIN limiter diodes 30 in this fashion is well known to one skilled in the art, and no further explanation of these components is required herein.

Because the receiver 45 must be able to reliably detect and process weak incoming signals, a low-noise amplifier (LNA) 35 is provided to amplify such signals before they reach the receiver 45. The LNA 35 is a sensitive electronic component, and it is for this reason that a transponder 200 typically employs PIN limiter diodes 30, to prevent large current from damaging the LNA 35.

Once the incoming signal is past the LNA 35, it is sent into a signal splitter 40, where the signal is split and sent to two separate end locations. The first location receiving the signal is the receiver 45 of the permanently-mounted transponder 200. The second location where the incoming signal is sent is to an external connector 55, which allows the antenna signal to be passed external to the transponder 200 to an external system. Optionally, protection circuitry 54 may be placed on the side of external connector 55 internal to (facing) the signal splitter 40, to prevent signals or stray voltages from the external system, which is likely a non-certified, portable device, from damaging the internal components of the permanently-mounted transponder 200. This type of protection circuitry is well-known to one skilled in the arts related to RF signal processing and this is not described in further detail here.

In this embodiment and example, the external system is a portable receiver 60, which can be connected to the external connector 55 via a wired connection 57, thus "feeding the antenna signal through" the permanently-mounted transponder and making it available for the portable receiver 60. The portable receiver 60 may be paired with an optional mobile device 65 over a wireless connection to allow information received by the portable receiver 60 to be displayed on the mobile device 65. The mobile device 65 may be any type of portable device with a display, such as an iPad, smart phone, tablet computer, or any other appropriate type of mobile device 65.

It should be noted that the use of and exact placement of the LNA 35 may be altered without deviating from the inventive concept described herein. For example, the signal could be sent through the signal splitter 40 first, and then each branch coming out of the splitter 40 could have an independent LNA 35 to amplify the split signal separately. Alternatively, an LNA 35 could be used on either side of the signal splitter 40, both before the split and after the split. Other arrangements and/or types of amplifiers may be used without deviating from the inventive concept described herein.

Figure 3:
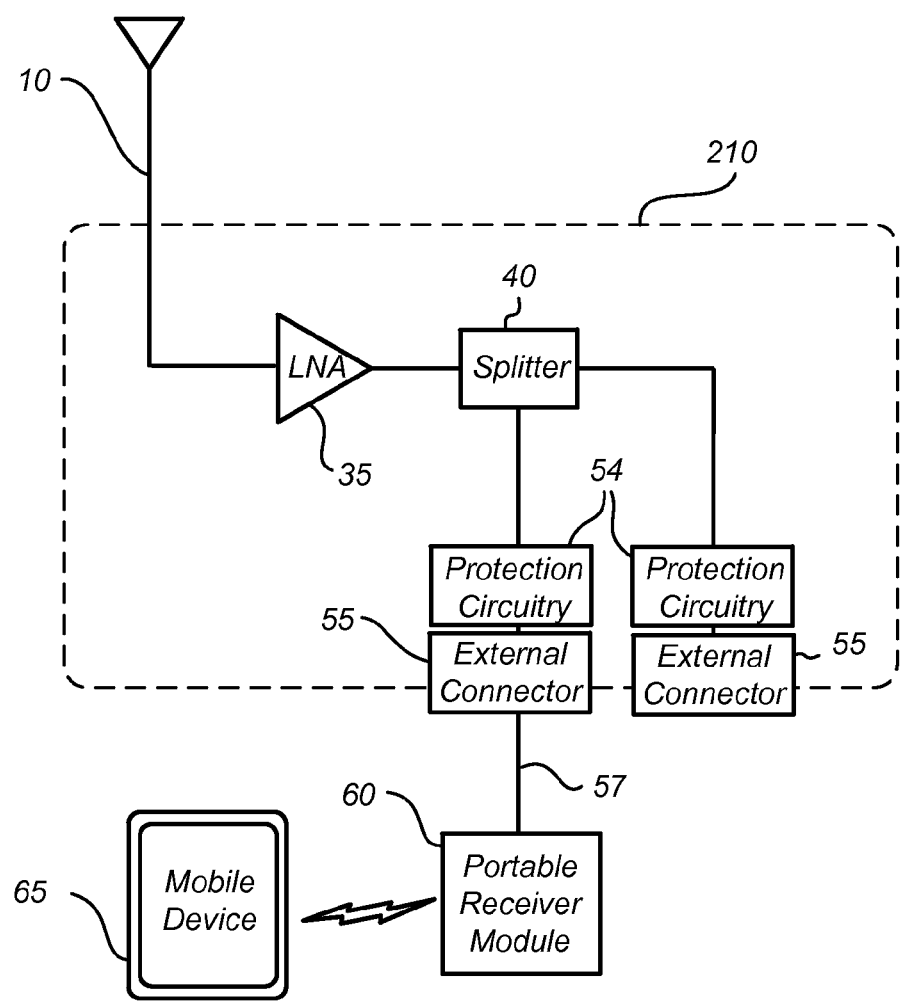
FIG. 3 shows an embodiment of the invention where the transponder of FIG. 2 has been replaced with a permanently-mounted antenna access module.

It should be noted that the phrase "portable receiver module" or "portable module" as used for item 60 in FIG. 2 and FIG. 3 is not intended to limit the portable module 60 to receiving only. In this example, the primary purpose of the portable receiver module 60 is to receive data such as ADS-B information, weather reports, etc., but the portable receiver module 60 may also be capable of transmitting data, as it does to the mobile device 65. The term "portable receiver module" as used herein is only intended to convey that the module 60 can receive, not that it is limited to that function.

By allowing a portable receiver 60 to be plugged into a permanently-mounted transponder 200 in this fashion, the present invention allows for the portable receiver 60 to take advantage of the accuracy and reliability of the permanently-mounted external antenna 10. The portable receiver 60 can thus take advantage of the precision signals available to the permanently-mounted transponder 200, but allow the flexibility of a portable receiver 60 paired wirelessly with a mobile device 65.

Having described the preferred embodiments, it will become apparent that various modifications can be made without departing from the scope of the invention as defined in the accompanying claims.

Specifically, an alternate embodiment of the invention can be created as shown in FIG. 3. FIG. 3 shows a version of the invention where the transponder 200 of FIG. 2 has been replaced with a permanently-mounted antenna access module 210. The antenna access module 210 does not contain a transmitter or receiver, but only provides the electronics and components necessary to feed the permanently-mounted antenna 10 to one or more external connectors 55. These components may include PIN limiter diodes and other protective circuitry (not shown, but known to one skilled in the art for such circuit designs and used as needed), a low-noise amplifier 35 so that weak signals can be passed through, and a splitter 40 to split the incoming RF (radio frequency) signal and send it to multiple external connectors 55. A portable receiver 60 can be connected to each external connector 55 via a wired connection 57, and each portable receiver 60 may be paired its own mobile device 65, or each portable receiver 60 may share a single mobile device 65.

Optionally, protection circuitry 54 may be placed on the side of external connector 55 internal to (facing) the signal splitter 40, to prevent signals or stray voltages from the external system, which is likely a non-certified, portable device, from damaging the internal components of the permanently-mounted antenna access module 210. This type of protection circuitry is well-known to one skilled in the arts related to RF signal processing and this is not described in further detail here.

An alternate embodiment of the embodiment in FIG. 3 may not use a splitter 40, but only provide a single external connector 55 to allow a single portable receiver 60 to connect to a permanently-mounted antenna 10.

The purpose of this embodiment of the invention is to provide a permanently-mounted access point to which portable electronic devices can be attached to provide access to RF signals received over permanently-mounted antennas.

In yet another alternate embodiment, the permanently-mounted avionics module may consist of a transmitter only, such as a module designed to transmit ADS-B Out signals only. In this embodiment, the permanent antenna used by the transmit-only function of the permanently-mounted avionics module could be made available via an external connector for use by a portable receiver module, even though the permanently-mounted avionics module itself does not contain a receiver.

Finally, the receiver 45 (FIG. 2) could be any of a number of types of receivers, including but not limited to a voice communications (COM) receiver, a navigation (NAV) receiver, an ADS-B receiver, or a GNSS receiver. The portable module 60 (FIG. 2) could similarly be any appropriate type of receiver, including but not limited to a voice communications (COM) receiver, a navigation (NAV) receiver, an ADS-B receiver, or a GNSS receiver.

It is to be understood that while certain embodiments and/or aspects of the invention have been shown and described, the invention is not limited thereto and encompasses various other embodiments and aspects.

The invention claimed is:

1. A system comprising: a permanently-mounted antenna; a permanently-mounted receiver module comprising:
a receiver;
a signal splitter;
an external connector; and
a transmitter connected to the permanently-mounted antenna; a portable receiver module;
wherein a signal received on the permanently-mounted antenna is passed to the signal splitter of the permanently-mounted receiver module; wherein the signal splitter splits the signal such that the signal is sent to both the receiver and to the external connector; and wherein the portable receiver module is connected to the external connector;
whereby the permanently-mounted antenna is used by the receiver of the permanently-mounted receiver module and fed through the permanently-mounted receiver module and made available to the portable receiver module through the external connector;
a circulator selectively connected to the transmitter, the receiver and the permanently-mounted antenna;
said circulator having operating modes configured for: a) sending signals from the transmitter to the permanently-mounted antenna in a first mode of operation; and
b) taking signals received on the external antenna and routing them to the receiver in a second mode of operation;
a plurality of PIN limiter diodes directly connected to the circulator and adapted for limiting current passing from said permanently-mounted antenna to said receiver in said second mode of operation;
said permanently-mounted antenna, said permanently-mounted receiver module and the circulator comprising an aviation transponder system; and
said transponder system being configured for adding an external portable device that can receive input information from an existing antenna and send output information to a display unit.

2. The aviation transponder system of claim 1, wherein the receiver comprises a voice communications (COM) receiver and the portable receiver is a portable voice communications (COM) receiver.

3. The aviation transponder system of claim 1, wherein the receiver comprises a navigation (NAV) receiver and the portable receiver is a portable navigation (NAV) receiver.

4. The aviation transponder system of claim 1, wherein the receiver is an ADS-B receiver and the portable receiver is a portable ADS-B receiver.

5. The aviation transponder system of claim 1, wherein the receiver is a GNSS receiver and the portable receiver is a portable GNSS receiver.

6. An aviation transponder antenna system comprising: a permanently-mounted antenna; a permanently-mounted antenna access module including: a signal splitter connected to said permanently-mounted antenna; protection circuitry connected directly to said signal splitter; an external connector connected directly to said protection circuitry whereby current passing to said external connector is limited by said protection circuitry; a portable receiver module connected to said external connector;
wherein a signal received on the permanently-mounted antenna is passed to the permanently-mounted antenna access module; wherein said antenna access module directs the signal such that the signal is sent to the at least one external connector;
wherein the portable receiver module is connected to the external connector; and
said permanently-mounted antenna and said permanently-mounted antenna access module collectively comprising an aviation transponder antenna system.

7. An aviation transponder antenna system comprising: a permanently-mounted antenna;
a permanently-mounted antenna access module comprising:
a signal splitter connected to said permanently-mounted antenna; at least one external connector;
protection circuitry connected directly to said signal splitter and said external connector and limiting current passing from said signal splitter to the at least one external connector:
a portable receiver module;
wherein a signal received on the permanently-mounted antenna is passed to the signal splitter of the permanently-mounted antenna access module; wherein the signal splitter directs the signal such that the signal is sent to said first external connector; and
wherein the portable receiver module is connected to the external connector.

8. A system comprising:
a permanently-mounted antenna;
a permanently-mounted transmitter module comprising:
a transmitter connected to said permanently-mounted antenna;
and an external connector;
a signal splitter;
a portable receiver module;
wherein a signal received on the permanently-mounted antenna is passed to the external connector;
protection circuitry connected directly to the splitter whereby current passing from said splitter to said external connector is limited;
wherein the portable receiver module is connected to the external connector; said permanently-mounted antenna and said permanently-mounted transmitter module comprising an aviation transponder system; and
whereby the permanently-mounted antenna is used by the transmitter of the permanently-mounted transmitter module and fed through the permanently-mounted transmitter module and made available to the portable receiver module through the external connector.

* * * * *